US011900873B2

(12) United States Patent
Yuan et al.

(10) Patent No.: US 11,900,873 B2
(45) Date of Patent: Feb. 13, 2024

(54) DISPLAY PANELS, METHODS OF DRIVING THE SAME, AND DISPLAY DEVICES

(71) Applicants: Hefei BOE Joint Technology Co., Ltd., Anhui (CN); BOE Technology Group Co., Ltd., Beijing (CN)

(72) Inventors: Zhidong Yuan, Beijing (CN); Yongqian Li, Beijing (CN); Meng Li, Beijing (CN); Can Yuan, Beijing (CN); Min He, Beijing (CN); Chao Jiao, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 253 days.

(21) Appl. No.: 17/439,522

(22) PCT Filed: Feb. 9, 2021

(86) PCT No.: PCT/CN2021/076326
§ 371 (c)(1),
(2) Date: Sep. 15, 2021

(87) PCT Pub. No.: WO2021/212981
PCT Pub. Date: Oct. 28, 2021

(65) Prior Publication Data
US 2023/0091012 A1 Mar. 23, 2023

(30) Foreign Application Priority Data
Apr. 23, 2020 (CN) ......................... 202010328502.2

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/0297* (2013.01); *G09G 2310/08* (2013.01)

(58) Field of Classification Search
CPC ............... G09G 3/3233; G09G 3/3208; G09G 2300/0819; G09G 2300/0842;
(Continued)

(56) References Cited

U.S. PATENT DOCUMENTS 9,472,140 B2 10/2016 Kanda et al.
10,424,247 B2 9/2019 Wang et al.
(Continued)

FOREIGN PATENT DOCUMENTS

CN 1702727 A 11/2005
CN 101206835 A 6/2008
(Continued)

OTHER PUBLICATIONS

PCT/CN2021/076326 international search report.
(Continued)

*Primary Examiner* — Christopher E Leiby
(74) *Attorney, Agent, or Firm* — IPro, PLLC

(57) ABSTRACT

This application relates to display panels, methods of driving the same, and display devices. The display panel includes: a first pixel circuit and a demultiplexing circuit. The first pixel circuit includes a first reset circuit, a first data writing circuit, and a first drive circuit. A first terminal of the first reset circuit is connected to a first terminal of the first drive circuit. A second terminal of the first reset circuit is connected to a first multiplexing signal line. A control terminal of the first drive circuit is connected to a first terminal of the first data writing circuit. A second terminal of the first data writing circuit is connected to the first
(Continued)

multiplexing signal line. The demultiplexing circuit includes a first control circuit and a second control circuit. A first terminal of the first control circuit is connected to the first multiplexing signal line. A second terminal of the first control circuit is used for receiving a reset signal. A first terminal of the second control circuit is connected to the first multiplexing signal line. A second terminal of the second control circuit is used for receiving a first data signal.

20 Claims, 4 Drawing Sheets

(58) Field of Classification Search
CPC ... G09G 2300/0465; G09G 2310/0297; G09G 2310/08; G09G 2310/0251; G09G 2320/0238
See application file for complete search history.

(56) References Cited

U.S. PATENT DOCUMENTS

| | | | | |
|---|---|---|---|---|
| 10,504,441 | B2 | 12/2019 | He et al. | |
| 2005/0265400 | A1* | 12/2005 | Shin | G09G 3/325 370/540 |
| 2006/0012587 | A1* | 1/2006 | Stevenson | G09G 3/3233 345/204 |
| 2008/0150844 | A1 | 6/2008 | Choi | |
| 2009/0256826 | A1 | 10/2009 | Asano | |
| 2010/0277400 | A1 | 11/2010 | Jeong | |
| 2017/0110055 | A1 | 4/2017 | Li et al. | |
| 2017/0140707 | A1 | 5/2017 | Xu et al. | |
| 2018/0233085 | A1 | 8/2018 | Wang | |
| 2018/0315373 | A1* | 11/2018 | Wang | G09G 3/325 |
| 2019/0066589 | A1 | 2/2019 | He et al. | |
| 2020/0335044 | A1* | 10/2020 | Kawachi | G09G 3/3275 |

FOREIGN PATENT DOCUMENTS

| | | | |
|---|---|---|---|
| CN | 101556762 | A | 10/2009 |
| CN | 104715726 | A | 6/2015 |
| CN | 104751804 | A | 7/2015 |
| CN | 106548753 | A | 3/2017 |
| CN | 106910463 | A | 6/2017 |
| CN | 107393478 | A | 11/2017 |
| CN | 109461407 | A | 3/2019 |
| CN | 111429842 | A | 7/2020 |
| JP | 2017227755 | A | 12/2017 |
| KR | 20180024082 | A | 3/2018 |
| KR | 101949222 | B1 | 2/2019 |

OTHER PUBLICATIONS

CN202010328502.2 first office action.
CN202010328502.2 second office action.
CN202010328502.2 Decision of Rejection.

* cited by examiner

DISPLAY PANELS, METHODS OF DRIVING THE SAME, AND DISPLAY DEVICES

CROSS-REFERENCE TO RELATED APPLICATIONS

This application is a national stage of international PCT Application No. PCT/CN2021/076326, filed on Feb. 9, 2021, which claims priority to Chinese patent application No. 202010328502.2 entitled "DISPLAY PANELS, METHODS OF DRIVING THE SAME, AND DISPLAY DEVICES", filed with the Chinese Patent Office on Apr. 23, 2020, the entire contents of which are incorporated herein by reference.

TECHNICAL FIELD

This application relates to the field of display technologies, and in particular, to display panels, methods for driving the same, and display devices.

BACKGROUND

LCD (Liquid Crystal Display) and active matrix OLED (Organic Light-Emitting Diode) are relatively mature in the field of display. The principle of an OLED display device is to excite spectra with various wavelengths by electron-hole recombination to form a graphic.

Generally, the OLED display device includes a display panel, a gate drive apparatus, a data driver, and a timing controller. The display panel includes a plurality of data lines, a plurality of gate lines, and a plurality of pixels controlled by the two former ones. The usual working mode is in a case that a gate drive signal is provided to a gate line, a plurality of pixels in a same row are provided with data voltages, and then emit light of various brightness according to the magnitude of the data voltages.

A pixel may include a pixel circuit. If the pixel circuit has a complex structure, and occupies a relatively large area, a display resolution or a light-emitting area of the pixel will be affected.

SUMMARY

The present application provides display panels, methods for driving the same, and display devices.

According to a first aspect of embodiments of the present application, a display panel is provided, including: a first pixel circuit, a first multiplexing signal line, and a demultiplexing circuit, where the first pixel circuit includes a first reset circuit, a first data writing circuit, a first storage circuit, and a first drive circuit, where a first terminal of the first reset circuit is connected to a first terminal of the first drive circuit, a second terminal of the first reset circuit is connected to the first multiplexing signal line, the first terminal of the first drive circuit is further connected to a first light-emitting element, a control terminal of the first drive circuit is connected to a first terminal of the first data writing circuit, a second terminal of the first data writing circuit is connected to the first multiplexing signal line, a first terminal of the first storage circuit is connected to the control terminal of the first drive circuit, and a second terminal of the first storage circuit is connected to the first terminal of the first drive circuit; and the demultiplexing circuit includes a first control circuit and a second control circuit, where a first terminal of the first control circuit is connected to the first multiplexing signal line, a second terminal of the first control circuit is used for receiving a reset signal, a first terminal of the second control circuit is connected to the first multiplexing signal line, and a second terminal of the second control circuit is used for receiving a first data signal.

In an embodiment, the display panel further includes: a second pixel circuit and a second multiplexing signal line, where the second pixel circuit includes a second reset circuit, a second data writing circuit, a second storage circuit and a second drive circuit, where a first terminal of the second reset circuit is connected to a first terminal of the second drive circuit, a second terminal of the second reset circuit is connected to the second multiplexing signal line, the first terminal of the second drive circuit is further connected to a second light-emitting element, a control terminal of the second drive circuit is connected to a first terminal of the second data writing circuit, a second terminal of the second data writing circuit is connected to the second multiplexing signal line, a first terminal of the second storage circuit is connected to the control terminal of the second drive circuit, and a second terminal of the second storage circuit is connected to the first terminal of the second drive circuit; the demultiplexing circuit further includes a third control circuit and a fourth control circuit, where a first terminal of the third control circuit is connected to the second multiplexing signal line, a second terminal of the third control circuit is used for receiving the reset signal, a first terminal of the fourth control circuit is connected to the second multiplexing signal line, and a second terminal of the fourth control circuit is used for receiving a second data signal.

In an embodiment, the display panel further includes: a reset signal line and a data signal line, where the second terminal of the first control circuit and the second terminal of the third control circuit are connected in parallel, and further connected to the reset signal line; and the second terminal of the second control circuit and the second terminal of the fourth control circuit are connected in parallel, and further connected to the data signal line.

In an embodiment, the display panel further includes: a first control signal line, a second control signal line, and a third control signal line, where a control terminal of the first control circuit and a control terminal of the third control circuit are respectively connected to the first control signal line, a control terminal of the second control circuit is connected to the second control signal line, and a control terminal of the fourth control circuit is connected to the third control signal line.

In an embodiment, the first control circuit includes a first transistor, a first terminal of the first transistor is the first terminal of the first control circuit, a second terminal of the first transistor is the second terminal of the first control circuit, and a control terminal of the first transistor is the control terminal of the first control circuit; the second control circuit includes a second transistor, where a first terminal of the second transistor is the first terminal of the second control circuit, and a second terminal of the second transistor is the second terminal of the second control circuit, and a control terminal of the second transistor is the control terminal of the second control circuit; the third control circuit includes a third transistor, where a first terminal of the third transistor is the first terminal of the third control circuit, a second terminal of the third transistor is the second terminal of the third control circuit, and a control terminal of the third transistor is the control terminal of the third control circuit; the fourth control circuit includes a fourth transistor, where a first terminal of the fourth transistor is the first terminal of the fourth control circuit, a second terminal of the fourth transistor is the second terminal of the fourth control circuit, and a control terminal of the fourth transistor is the control terminal of the fourth control circuit.

In an embodiment, the first transistor is an N-type transistor, where the first terminal of the first transistor is a source electrode, the second terminal of the first transistor is a drain electrode, and the control terminal of the first transistor is a gate electrode; the second transistor is an N-type transistor, where the first terminal of the second transistor is a source electrode, the second terminal of the second transistor is a drain electrode, and the control terminal of the second transistor is a gate electrode; the third transistor is an N-type transistor, where the first terminal of the third transistor is a source electrode, the second terminal of the third transistor is a drain electrode, and the control terminal of the third transistor is a gate electrode; the fourth transistor is an N-type transistor, where the first terminal of the fourth transistor is a source electrode, the second terminal of the fourth transistor is a drain electrode, and the control terminal of the fourth transistor is a gate electrode.

In an embodiment, the display panel further includes: a first gate line and a second gate line, where a control terminal of the first reset circuit and a control terminal of the second reset circuit are respectively connected to the first gate line; a control terminal of the first data writing circuit and a control terminal of the second data writing circuit are respectively connected to the second gate line.

In an embodiment, the first pixel circuit further includes a first compensation circuit, a first terminal of the first compensation circuit is connected to the control terminal of the first drive circuit, a second terminal of the first compensation circuit is connected to a power signal line, and the power signal line is used for providing a reference voltage signal; the second pixel circuit further includes a second compensation circuit, a first terminal of the second compensation circuit is connected to the control terminal of the second drive circuit, and a second terminal of the second compensation circuit is connected to the power signal line.

In an embodiment, the display panel further includes: a third gate line, where a control terminal of the first compensation circuit and a control terminal of the second compensation circuit are respectively connected to the third gate line.

In an embodiment, the first reset circuit includes a fifth transistor, where a first terminal of the fifth transistor is the first terminal of the first reset circuit, a second terminal of the fifth transistor is the second terminal of the first reset circuit, and a control terminal of the fifth transistor is the control terminal of the first reset circuit; the first compensation circuit includes a sixth transistor, where a first terminal of the sixth transistor is the first terminal of the first compensation circuit, a second terminal of the sixth transistor is the second terminal of the first compensation circuit, and a control terminal of the sixth transistor is the control terminal of the first compensation circuit; the first data writing circuit includes a seventh transistor, where a first terminal of the seventh transistor is the first terminal of the first data writing circuit, a second terminal of the seventh transistor is the second terminal of the first data writing circuit, and a control terminal of the seventh transistor is the control terminal of the first data writing circuit; the first drive circuit includes an eighth transistor, where a first terminal of the eighth transistor is the first terminal of the first drive circuit, a second terminal of the eighth transistor is a second terminal of the first drive circuit, and a control terminal of the eighth transistor is the control terminal of the first drive circuit; the first storage circuit includes a first capacitor, a first terminal of the first capacitor is the first terminal of the first storage circuit, and a second terminal of the first capacitor is the second terminal of the first storage circuit; the second reset circuit includes a ninth transistor, where a first terminal of the ninth transistor is the first terminal of the second reset circuit, a second terminal of the ninth transistor is the second terminal of the second reset circuit, and a control terminal of the ninth transistor is the control terminal of the second reset circuit; the second compensation circuit includes a tenth transistor, where a first terminal of the tenth transistor is the first terminal of the second compensation circuit, a second terminal of the tenth transistor is the second terminal of the second compensation circuit, and a control terminal of the tenth transistor is the control terminal of the second compensation circuit; the second data writing circuit includes an eleventh transistor, where a first terminal of the eleventh transistor is the first terminal of the second data writing circuit, a second terminal of the eleventh transistor is the second terminal of the second data writing circuit, and a control terminal of the eleventh transistor is the control terminal of the second data writing circuit; the second drive circuit includes a twelfth transistor, where a first terminal of the twelfth transistor is the first terminal of the second drive circuit, a second terminal of the twelfth transistor is a second terminal of the second drive circuit, and a control terminal of the twelfth transistor is the control terminal of the second drive circuit; the second storage circuit includes a second capacitor, where a first terminal of the second capacitor is the first terminal of the second storage circuit, and a second terminal of the second capacitor is the second terminal of the second storage circuit.

In an embodiment, the fifth transistor is an N-type transistor, the first terminal of the fifth transistor is a source electrode, the second terminal of the fifth transistor is a drain electrode, and the control terminal of the fifth transistor is a gate electrode; the sixth transistor is an N-type transistor, the first terminal of the sixth transistor is a source electrode, the second terminal of the sixth transistor is a drain electrode, and the control terminal of the sixth transistor is a gate electrode; the seventh transistor is an N-type transistor, the first terminal of the seventh transistor is a source electrode, the second terminal of the seventh transistor is a drain electrode, and the control terminal of the seventh transistor is a gate electrode; the eighth transistor is an N-type transistor, the first terminal of the eighth transistor is a source electrode, the second terminal of the eighth transistor is a drain electrode, and the control terminal of the eighth transistor is a gate electrode; the ninth transistor is an N-type transistor, the first terminal of the ninth transistor is a source electrode, the second terminal of the ninth transistor is a drain electrode, and the control terminal of the ninth transistor is a gate electrode; the tenth transistor is an N-type transistor, the first terminal of the tenth transistor is a source electrode, the second terminal of the tenth transistor is a drain electrode, and the control terminal of the tenth transistor is a gate electrode; the eleventh transistor is an N-type transistor, the first terminal of the eleventh transistor is a source electrode, the second terminal of the eleventh transistor is a drain electrode, and the control terminal of the eleventh transistor is a gate electrode; the twelfth transistor is an N-type transistor, the first terminal of the twelfth transistor is a source electrode, the second terminal of the twelfth transistor is a drain electrode, and the control terminal of the twelfth transistor is a gate electrode.

In an embodiment, the display panel includes: a display region and a peripheral region, where the peripheral region is adjacent to the display region, the first pixel circuit is located in the display region, and the demultiplexing circuit is located in the peripheral region.

According to a second aspect of the embodiments of the present application, a display device is provided, including: a display panel as described above.

According to a third aspect of the embodiments of the present application, a method of driving a display panel is provided. The method is applied to the display panel as described above, and includes: during a reset time period, outputting, via a first control circuit, a reset signal to a first multiplexing signal line, and inputting, via the first multiplexing signal line and a first reset circuit, the reset signal to a first terminal of a first drive circuit to reset an electric potential of the first terminal of the first drive circuit; and during a first data writing time period, outputting, via a second control circuit, a received first data signal to the first multiplexing signal line, and inputting, via the first multiplexing signal line and the first data writing circuit, the first data signal to a control terminal of the first drive circuit.

As can be seen from the embodiments, by the demultiplexing circuit and the first multiplexing signal line, the reset signal can be output to the first reset circuit via the first multiplexing signal line; additionally, the first data signal can be output to the first data writing circuit via the first multiplexing signal line. In this way, for a pixel circuit, one signal line is reduced, so that a space can be saved, thereby optimizing pixel layout and increasing a display resolution or a pixel light-emitting area, while helping to reset a data signal line and increasing coherency of signal writing.

It should be understood that the above general description and the following detailed description are only exemplary and explanatory and are not limited to the present application.

BRIEF DESCRIPTION OF THE DRAWINGS

The accompanying drawings, which are incorporated in and constitute a part of this specification, illustrate embodiments consistent with the present application and, together with the specification, serve to explain the principles of the application.

DETAILED DESCRIPTION OF THE EMBODIMENTS

Figure 1:
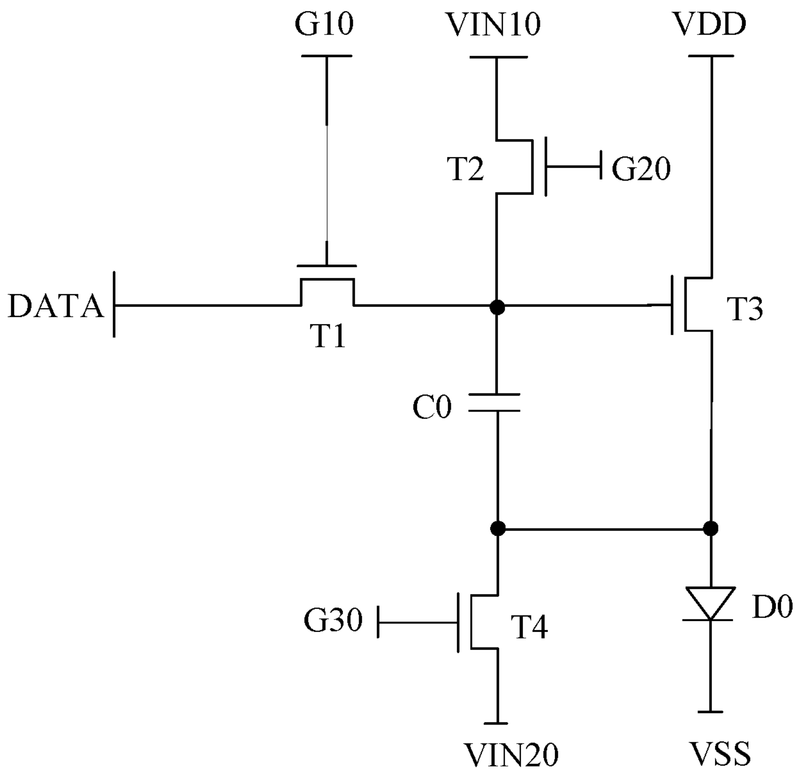
FIG. 1 is a schematic diagram illustrating a structure of a pixel circuit.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

There exists a pixel circuit as shown in FIG. 1 for driving a light-emitting element D0 to emit light. The pixel circuit is a 4T1C pixel circuit. As shown in FIG. 1, the 4T1C pixel circuit includes transistors T1, T2, T3, T4 and a capacitor C0. The transistors T1, T2, T3, T4 are N-type transistors. A drain electrode of the transistor T1 is used for receiving a data signal DATA, and a gate electrode of the transistor T1 is used for receiving a gate drive signal G10. A drain electrode of the transistor T2 is used for receiving a first initialization signal VIN10, and a gate electrode of the transistor T2 is used for receiving a gate drive signal G20. A drain electrode of the transistor T3 is used for receiving a power supply voltage signal VDD. A gate electrode of the transistor T4 is used for receiving a gate drive signal G30, and a drain electrode of the transistor T4 is used for receiving a second initialization signal VIN20. A negative electrode of the light-emitting element D0 is used for receiving a low voltage power signal VSS.

Figure 2:
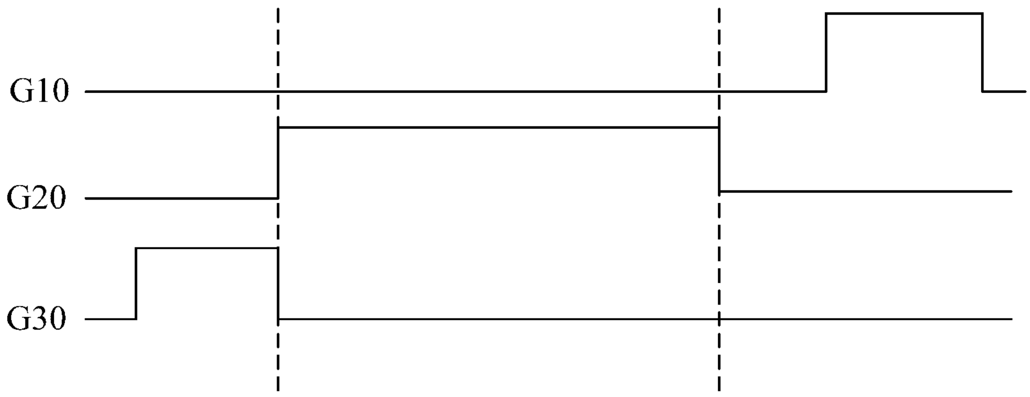
FIG. 2 is a diagram illustrating a driving timing of the pixel circuit shown in FIG. 1.

The gate drive signal G10, the gate drive signal G20, and the gate drive signal G30 are shown in FIG. 2. As can be seen from FIG. 2, a conduction time of the transistor T1 is different from a conduction time of the transistor T4, and the second initialization signal VIN20 and the data signal DATA are not supplied at a same time.

Figure 3:
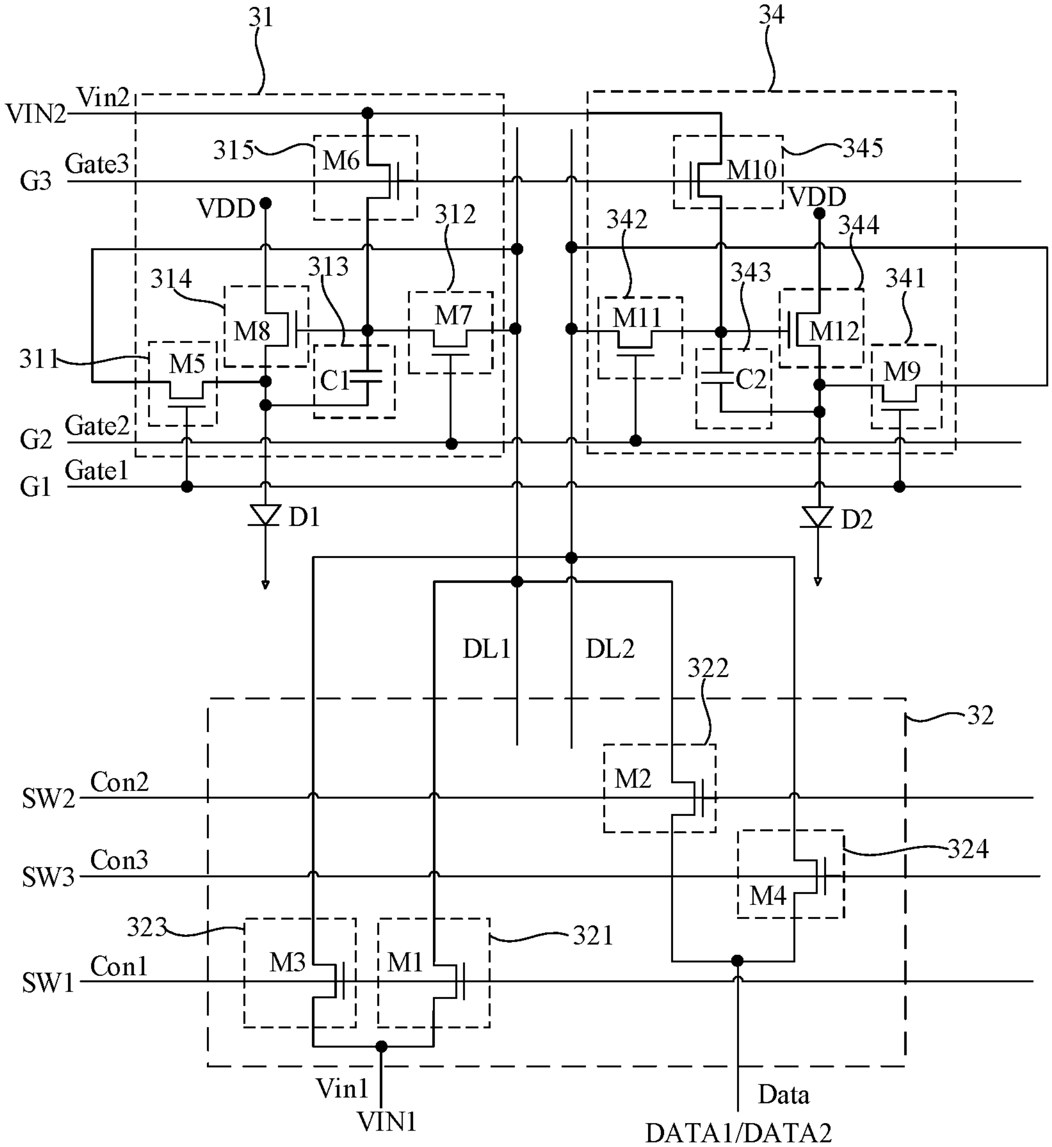
FIG. 3 is a schematic diagram illustrating a structure of a display panel according to an embodiment of the present application.

At least one embodiment of the present application provides a display panel. As shown in FIG. 3, the display panel includes a first pixel circuit 31, a first multiplexing signal line DL1, and a demultiplexing circuit 32.

As shown in FIG. 3, the first pixel circuit 31 includes a first reset circuit 311, a first data writing circuit 312, a first storage circuit 313, and a first drive circuit 314. A first terminal of the first reset circuit 311 is connected to a first terminal of the first drive circuit 314, and a second terminal of the first reset circuit 311 is connected to the first multiplexing signal line DL1. The first terminal of the first drive circuit 314 is further connected to a first light-emitting element D1, and a control terminal of the first drive circuit 314 is connected to a first terminal of the first data writing circuit 312. A second terminal of the first data writing circuit 312 is connected to the first multiplexing signal line DL1. A first terminal of the first storage circuit 313 is connected to the control terminal of the first drive circuit 314, and a second terminal of the first storage circuit 313 is connected to the first terminal of the first drive circuit 314.

As shown in FIG. 3, the demultiplexing circuit 32 includes a first control circuit 321 and a second control circuit 322. A first terminal of the first control circuit 321 is connected to the first multiplexing signal line DL1, and a second terminal of the first control circuit 321 is used for receiving a reset signal VIN1. A first terminal of the second control circuit 322 is connected to the first multiplexing signal line DL1, and a second terminal of the second control circuit 322 is used for receiving a first data signal DATA1.

In this embodiment, by the demultiplexing circuit and the first multiplexing signal line, the reset signal can be output to the first reset circuit via the first multiplexing signal line; additionally, the first data signal can also be output to the first data writing circuit via the first multiplexing signal line. In this way, for each pixel circuit, one signal line is reduced, so that a space can be saved, thereby optimizing pixel layout and increasing a display resolution or a pixel light-emitting area, while helping to reset a data signal line and increasing a coherency of signal writing.

A display panel provided by an embodiment of the present application is briefly introduced above. A display panel provided by an embodiment of the present application will be described in detail below.

At least one embodiment of the present application further provides a display panel. As shown in FIG. 3, the display panel includes a first pixel circuit 31, a second pixel circuit 34, a first multiplexing signal line DL1, a second multiplexing signal line DL2, a demultiplexing circuit 32, a first gate line Gate1, a second gate line Gate2, a third gate line Gate3, a first control signal line Con1, a second control signal line Con2, a third control signal line Con3, a reset signal line Vin1, a power signal line Vin2, and a data signal line Data.

In this embodiment, the display panel may include pixel circuits arranged in array. The pixel circuits arranged in array include the first pixel circuit 31 and the second pixel circuit 34 mentioned above. The first pixel circuit 31 can be located in an $i^{th}$ row and a $j^{th}$ column, and the second pixel circuit 34 can be located in the $i^{th}$ row and a $(j+1)^{th}$ column, where the i and j are positive integers respectively. The demultiplexing circuit 32 is connected to the first pixel circuit 31 via the first multiplexing signal line DL1, and the demultiplexing circuit 32 is further connected to the second pixel circuit 34 via the second multiplexing signal line DL2.

In this embodiment, as shown in FIG. 3, the first pixel circuit 31 includes a first reset circuit 311, a first data writing circuit 312, a first storage circuit 313, a first drive circuit 314, and a first compensation circuit 315.

Figure 4:
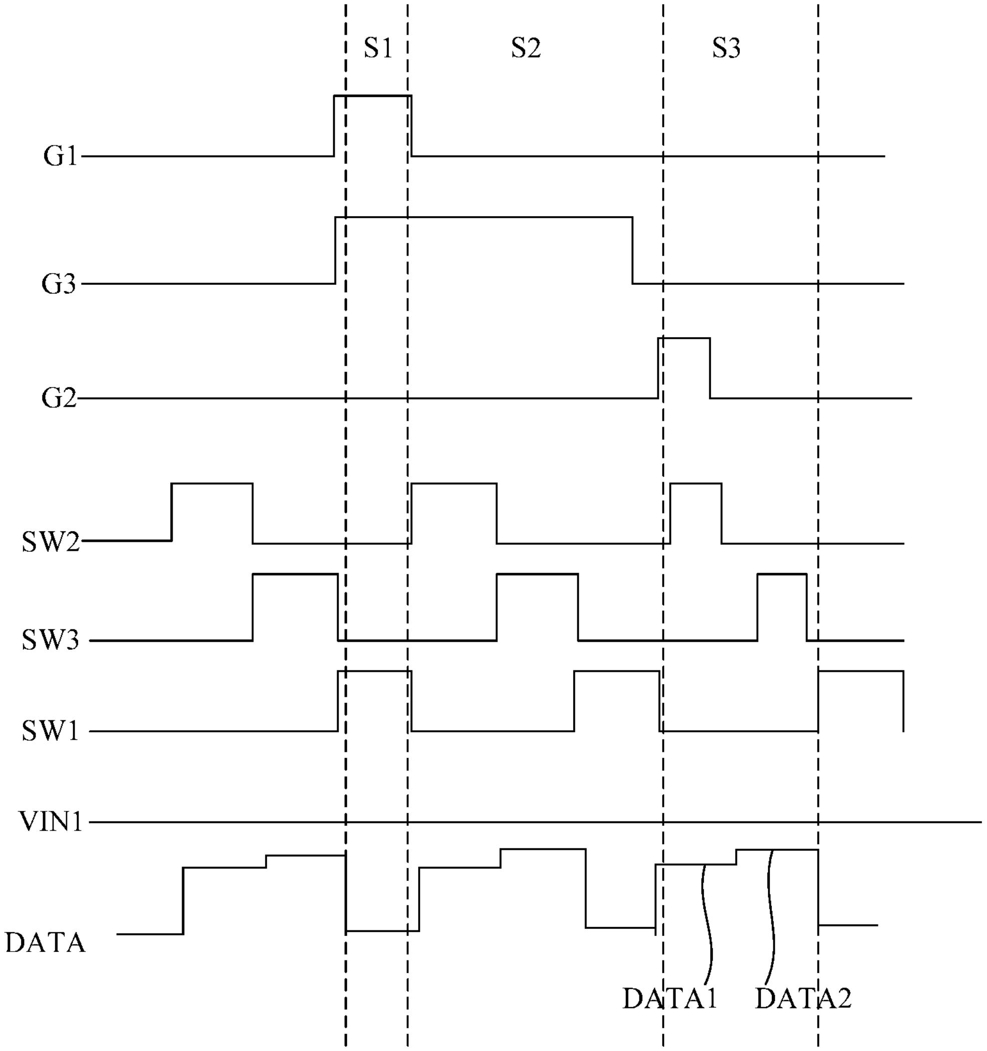
FIG. 4 is a diagram illustrating a driving timing of a display panel shown in FIG. 3.

As shown in FIG. 3, a first terminal of the first reset circuit 311 is connected to a first terminal of the first drive circuit 314. A second terminal of the first reset circuit 311 is connected to the first multiplexing signal line DL1. A control terminal of the first reset circuit 311 is connected to the first gate line Gate1. The first gate line Gate1 is used for providing a first gate drive signal G1 to pixel circuits in the $i^{th}$ row, and the first gate drive signal G1 is used for controlling the first reset circuit 311 to turn on and off. A timing of the first gate drive signal G1 is shown in FIG. 4.

In this embodiment, the first reset circuit 311 includes a fifth transistor M5. A first terminal of the fifth transistor M5 is the first terminal of the first reset circuit 311, a second terminal of the fifth transistor M5 is the second terminal of the first reset circuit 311, and a control terminal of the fifth transistor M5 is the control terminal of the first reset circuit 311. In this embodiment, the fifth transistor M5 is an N-type transistor. The first terminal of the fifth transistor M5 is a source electrode, the second terminal of the fifth transistor M5 is a drain electrode, and the control terminal of the fifth transistor M5 is a gate electrode. It should be noted that the specific structure of the first reset circuit 311 is not limited to the structure provided in the embodiment of the present application.

As shown in FIG. 3, the first terminal of the first drive circuit 314 is further connected to a first light-emitting element D1. A control terminal of the first drive circuit 314 is connected to a first terminal of the first data writing circuit 312. A second terminal of the first drive circuit 314 is used for receiving a power supply voltage signal VDD.

In this embodiment, the first drive circuit 314 includes an eighth transistor M8. A first terminal of the eighth transistor M8 is the first terminal of the first drive circuit 314, a second terminal of the eighth transistor M8 is the second terminal of the first drive circuit 314, and a control terminal of the eighth transistor M8 is the control terminal of the first drive circuit 314. The eighth transistor M8 is an N-type transistor. The first terminal of the eighth transistor M8 is a source electrode, the second terminal of the eighth transistor M8 is a drain electrode, and the control terminal of the eighth transistor M8 is a gate electrode.

As shown in FIG. 3, a second terminal of the first data writing circuit 312 is connected to the first multiplexing signal line DL1. A control terminal of the first data writing circuit 312 is connected to the second gate line Gate2. The second gate line Gate2 is used for providing a second gate drive signal G2 to pixel circuits in the $i^{th}$ row. The second gate drive signal G2 is used for controlling the first data writing circuit 312 to turn on and off. A timing of the second gate drive signal G2 is shown in FIG. 4.

In this embodiment, the first data writing circuit 312 includes a seventh transistor M7. A first terminal of the seventh transistor M7 is the first terminal of the first data writing circuit 312, a second terminal of the seventh transistor M7 is the second terminal of the first data writing circuit 312, and a control terminal of the seventh transistor M7 is the control terminal of the first data writing circuit 312. The seventh transistor M7 is an N-type transistor. The first terminal of the seventh transistor M7 is a source electrode, the second terminal of the seventh transistor M7 is a drain electrode, and the control terminal of the seventh transistor M7 is a gate electrode.

As shown in FIG. 3, a first terminal of the first storage circuit 313 is connected to the control terminal of the first drive circuit 314, and a second terminal of the first storage circuit 313 is connected to the first terminal of the first drive circuit 314.

In this embodiment, the first storage circuit 313 includes a first capacitor C1. A first terminal of the first capacitor C1 is the first terminal of the first storage circuit 313, and a second terminal of the first capacitor C1 is the second terminal of the first storage circuit 313.

As shown in FIG. 3, a first terminal of the first compensation circuit 315 is connected to the control terminal of the first drive circuit 314, and a second terminal of the first compensation circuit 315 is connected to the power signal line Vin2. The power signal line Vin2 is used for providing a reference voltage signal VIN2. A voltage value of the reference voltage signal VIN2 is Vref. A control terminal of the first compensation circuit 315 is connected to the third gate line Gate3. The third gate line Gate3 is used for providing a third gate drive signal G3 to pixel circuits in the $i^{th}$ row. The third gate drive signal G3 is used for controlling the first compensation circuit 315 to turn on and off. A timing of the third gate drive signal G3 is shown in FIG. 4.

In this embodiment, the first compensation circuit 315 includes a sixth transistor M6. A first terminal of the sixth transistor M6 is the first terminal of the first compensation circuit 315, a second terminal of the sixth transistor M6 is the second terminal of the first compensation circuit 315, and a control terminal of the sixth transistor M6 is the control terminal of the first compensation circuit 315. The sixth transistor M6 is an N-type transistor. The first terminal of the sixth transistor M6 is a source electrode, the second terminal of the sixth transistor M6 is a drain electrode, and the control terminal of the sixth transistor M6 is a gate electrode.

In this embodiment, as shown in FIG. 3, the second pixel circuit 34 includes a second reset circuit 341, a second data writing circuit 342, a second storage circuit 343, a second drive circuit 344, and a second compensation circuit 345.

As shown in FIG. 3, a first terminal of the second reset circuit 341 is connected to a first terminal of the second drive circuit 344, a second terminal of the second reset circuit 341 is connected to the second multiplexing signal line DL2, and a control terminal of the second reset circuit 341 is connected to the first gate line Gate1. The first gate drive signal G1 is further used for controlling the second reset circuit 341 to turn on and off. The timing of the first gate drive signal G1 is shown in FIG. 4.

In this embodiment, the second reset circuit 341 includes a ninth transistor M9. A first terminal of the ninth transistor M9 is the first terminal of the second reset circuit 341, a second terminal of the ninth transistor M9 is the second terminal of the second reset circuit 341, and a control terminal of the ninth transistor M9 is the control terminal of the second reset circuit 341. The ninth transistor M9 is an N-type transistor. The first terminal of the ninth transistor M9 is a source electrode, the second terminal of the ninth transistor M9 is a drain electrode, and the control terminal of the ninth transistor M9 is a gate electrode.

As shown in FIG. 3, the first terminal of the second drive circuit 344 is further connected to a second light-emitting element D2. A control terminal of the second drive circuit 344 is connected to a first terminal of the second data writing circuit 342. A second terminal of the second drive circuit 344 is used for receiving a power supply voltage signal VDD.

In this embodiment, the second drive circuit 344 includes a twelfth transistor M12. A first terminal of the twelfth transistor M12 is the first terminal of the second drive circuit 344, a second terminal of the twelfth transistor M12 is the second terminal of the second drive circuit 344, and a control terminal of the twelfth transistor M12 is the control terminal of the second drive circuit 344. The twelfth transistor M12 is an N-type transistor. The first terminal of the twelfth transistor M12 is a source electrode, the second terminal of the twelfth transistor M12 is a drain electrode, and the control terminal of the twelfth transistor M12 is a gate electrode.

As shown in FIG. 3, a second terminal of the second data writing circuit 342 is connected to the second multiplexing signal line DL2, and a control terminal of the second data writing circuit 342 is connected to the second gate line Gate2. The second gate drive signal G2 is further used for controlling the second data writing circuit 342 to turn on and off. The timing of the second gate drive signal G2 is shown in FIG. 4.

In this embodiment, the second data writing circuit 342 includes an eleventh transistor M11. A first terminal of the eleventh transistor M11 is the first terminal of the second data writing circuit 342, a second terminal of the eleventh transistor M11 is the second terminal of the second data writing circuit 342, and a control terminal of the eleventh transistor M11 is the control terminal of the second data writing circuit 342. The eleventh transistor M11 is an N-type transistor. The first terminal of the eleventh transistor M11 is a source electrode, the second terminal of the eleventh transistor M11 is a drain electrode, and the control terminal of the eleventh transistor M11 is a gate electrode.

As shown in FIG. 3, a first terminal of the second storage circuit 343 is connected to the control terminal of the second drive circuit 344, and a second terminal of the second storage circuit 343 is connected to the first terminal of the second drive circuit 344.

In this embodiment, the second storage circuit 343 includes a second capacitor C2. A first terminal of the second capacitor C2 is the first terminal of the second storage circuit 343, and a second terminal of the second capacitor C2 is the second terminal of the second storage circuit 343.

As shown in FIG. 3, a first terminal of the second compensation circuit 345 is connected to the control terminal of the second drive circuit 344, a second terminal of the second compensation circuit 345 is connected to the power signal line Vin2, and a control terminal of the second compensation circuit 345 is connected to the third gate line Gate3. The third gate drive signal G3 is further used for controlling the second compensation circuit 345 to turn on and off. The timing of the third gate drive signal G3 is shown in FIG. 4.

In this embodiment, the second compensation circuit 345 includes a tenth transistor M10. A first terminal of the tenth transistor M10 is the first terminal of the second compensation circuit 345, a second terminal of the tenth transistor M10 is the second terminal of the second compensation circuit 345, and a control terminal of the tenth transistor M10 is the control terminal of the second compensation circuit 345. The tenth transistor M10 is an N-type transistor. The first terminal of the tenth transistor M10 is a source electrode, the second terminal of the tenth transistor M10 is a drain electrode, and the control terminal of the tenth transistor M10 is a gate electrode.

As shown in FIG. 3, the demultiplexing circuit 32 includes a first control circuit 321, a second control circuit 322, a third control circuit 323, and a fourth control circuit 324.

As shown in FIG. 3, a first terminal of the first control circuit 321 is connected to the first multiplexing signal line DL1. A second terminal of the first control circuit 321 is used for receiving a reset signal VIN1. A control terminal of the first control circuit 321 is connected to the first control signal line Con1. The first control signal line Con1 is used for providing a first switch signal SW1. The first switch signal SW1 is used for controlling the first control circuit 321 to turn on and off. Timings of the reset signal VIN1 and the first switch signal SW1 are shown in FIG. 4.

In this embodiment, the first control circuit 321 includes a first transistor M1. A first terminal of the first transistor M1 is the first terminal of the first control circuit 321, a second terminal of the first transistor M1 is the second terminal of the first control circuit 321, and a control terminal of the first transistor M1 is the control terminal of the first control circuit 321. The first transistor M1 is an N-type transistor. The first terminal of the first transistor M1 is a source electrode, the second terminal of the first transistor M1 is a drain electrode, and the control terminal of the first transistor M1 is a gate electrode.

As shown in FIG. 3, a first terminal of the second control circuit 322 is connected to the first multiplexing signal line DL1. A second terminal of the second control circuit 322 is used for receiving a first data signal DATA1. A control terminal of the second control circuit is connected to the second control signal line Con2. The second control signal line Con2 is used for providing a second switch signal SW2. The second switch signal SW2 is used for controlling the second control circuit 322 to turn on and off. A timing of the second switch signal SW2 is shown in FIG. 4.

In this embodiment, the second control circuit 322 includes a second transistor M2. A first terminal of the second transistor M2 is the first terminal of the second control circuit 322, a second terminal of the second transistor M2 is the second terminal of the second control circuit 322, and a control terminal of the second transistor M2 is the control terminal of the second control circuit 322. The second transistor M2 is an N-type transistor. The first terminal of the second transistor M2 is a source electrode, the second terminal of the second transistor M2 is a drain electrode, and the control terminal of the second transistor M2 is a gate electrode.

As shown in FIG. 3, a first terminal of the third control circuit 323 is connected to the second multiplexing signal line DL2. A second terminal of the third control circuit 323 is used for receiving the reset signal VIN1. A control terminal of the third control circuit 323 is connected to the first control signal line Con1. The first switch signal SW1 is further used for controlling the third control circuit 323 to turn on and off.

In this embodiment, the third control circuit 323 includes a third transistor M3. A first terminal of the third transistor M3 is the first terminal of the third control circuit 323, a second terminal of the third transistor M3 is the second terminal of the third control circuit 323, and a control terminal of the third transistor M3 is the control terminal of the third control circuit 323. The third transistor M3 is an N-type transistor. The first terminal of the third transistor M3 is a source electrode, the second terminal of the third transistor M3 is a drain electrode, and the control terminal of the third transistor M3 is a gate electrode.

As shown in FIG. 3, a first terminal of the fourth control circuit 324 is connected to the second multiplexing signal line DL2. A second terminal of the fourth control circuit 324 is used for receiving a second data signal DATA2. A control terminal of the fourth control circuit 324 is connected to the third control signal line Con3. The third control signal line Con3 is used for providing a third switch signal SW3. The third switch signal SW3 is used for controlling the fourth control circuit 324 to turn on and off. A timing of the third switch signal SW3 is shown in FIG. 4.

In this embodiment, the fourth control circuit 324 includes a fourth transistor M4. A first terminal of the fourth transistor M4 is the first terminal of the fourth control circuit 324, a second terminal of the fourth transistor M4 is the second terminal of the fourth control circuit 324, and a control terminal of the fourth transistor M4 is the control terminal of the fourth control circuit 324. The fourth transistor M4 is an N-type transistor. The first terminal of the fourth transistor M4 is a source electrode, the second terminal of the fourth transistor M4 is a drain electrode, and the control terminal of the fourth transistor M4 is a gate electrode.

In this embodiment, as shown in FIG. 3, the second terminal of the first control circuit 321 and the second terminal of the third control circuit 323 are connected in parallel, and then, further connected to the reset signal line Vin1. The second terminal of the second control circuit 322 and the second terminal of the fourth control circuit 324 are connected in parallel, and then, further connected to the data signal line Data. In this way, the first control circuit 321 and the third control circuit 323 can share one reset signal line, and the second control circuit 322 and the fourth control circuit 324 can share one data signal line, so that signal lines can be saved, and thereby a space can be saved.

When the display panel is driven to work by signals as shown in FIG. 4, its working process includes three stages: a first stage S1, a second stage S2, and a third stage S3.

In the first stage S1, the first gate drive signal G1 and the first switch signal SW1 are at a high level, and the first transistor M1, the third transistor M3, the fifth transistor M5, and the ninth transistor M9 are turned on. The reset signal VIN1 is transmitted to the source electrode of the eighth transistor M8 via the first multiplexing signal line DL1 to reset an electric potential of the source electrode of the eighth transistor M8; and the reset signal VIN1 is transmitted to the source electrode of the twelfth transistor M12 via the second multiplexing signal line DL2 to reset an electric potential of the source electrode of the twelfth transistor M12. Therefore, a time period of the first stage S1 can be referred to as a reset time period.

In the first stage S1, the third gate drive signal G3 is at a high level, the sixth transistor M6 and the tenth transistor M10 are turned on, and the reference voltage signal VIN2 is written into the gate electrode of the eighth transistor M8 and the gate electrode of the twelfth transistor M12 respectively. Therefore, a voltage Vgs1 between the gate electrode and the source electrode of the eighth transistor M8 equals to Vref (that is, Vgs1=Vref), and a voltage Vgs2 between the gate electrode and the source electrode of the twelfth transistor M12 equals to Vref (Vgs2=Vref). The eighth transistor M8 and the twelfth transistor M12 are respectively used for driving the first light-emitting element D1 and the second light-emitting element D2 to emit light. Therefore, the eighth transistor M8 and the twelfth transistor M12 can be referred to as drive transistors.

In the second stage S2, the second switch signal SW2 and the third switch signal SW3 regularly take turns to be at a high level to write a data signal DATA into pixel circuits in other rows; and the first switch signal SW1 regularly take turns to be at a high level to reset electric potentials of source electrodes of drive transistors in pixel circuits in other rows.

In the second stage S2, for pixel circuits in the $i^{th}$ row, since the first gate drive signal G1 is at a low level, the electric potentials of the source electrodes of the eighth transistor M8 and the twelfth transistor M12 are not affected by the reset signal VIN1.

In the second stage S2, the third gate drive signal G3 is at a high level, an electric potential of the gate electrode of the eighth transistor M8 keeps being affected by the reference voltage signal VIN2 and remains constant, and an electric potential Vs1 of the source electrode of the eighth transistor M8 is boosted. When Vref−Vs1=Vth1 is satisfied, the eighth transistor M8 is turned off, where Vth1 is a threshold voltage of the eighth transistor M8. In this way, detection of the threshold voltage Vth1 of the eighth transistor M8 is completed.

Similarly, in the second stage S2, G3 is at a high level, an electric potential of the gate electrode of the twelfth transistor M12 keeps being affected by the reference voltage signal VIN2 and remains constant, and an electric potential Vs2 of the source electrode of the twelfth transistor M12 is boosted. When Vref−Vs2=Vth2 is satisfied, the twelfth transistor M12 is turned off, where Vth2 is a threshold voltage of the twelfth transistor M12. In this way, detection of the threshold voltage Vth2 of the twelfth transistor M12 is completed.

In the third stage S3, when the second gate drive signal G2 and the second switch signal SW2 are at a high level, and the first switch signal SW1 and the third switch signal SW3 are at a low level, the second transistor M2 is turned on, and the first data signal DATA1 is written into the first pixel circuit 31 through the first multiplexing signal line DL1. When the second gate drive signal G2 and the third switch signal SW3 are at a high level, and the first switch signal SW1 and the second switch signal SW2 are at a low level, the fourth transistor M4 is turned on, and the second data signal DATA2 is written into the second pixel circuit 32 through the second multiplexing signal line DL2. In this way, writing the data signal DATA into the first pixel circuit 31 and the second pixel circuit 34 is completed. A time period during which the first multiplexing signal line DL1 writes the first data signal DATA1 into the first pixel circuit 31 can be referred to as a first data writing time period. A time period during which the second multiplexing signal line DL2 writes the second data signal DATA2 into the second pixel circuit 32 can be referred to as a second data writing time period.

For the eighth transistor M8, a voltage Vgs1 between the gate electrode and the source electrode of the eighth transistor M8 equals to $V_{DATA1}$−Vref+Vth1 (that is, Vgs1=$V_{DATA1}$−Vref+Vth1), where $V_{DATA1}$ is a voltage value of the first data signal DATA1. Substituting Vgs1=$V_{DATA1}$−Vref+Vth1 into a saturation area current formula of the eighth transistor M8, an expression of current $I_1$ flowing through the source electrode and the drain electrode of the eighth transistor M8 can be obtained as follows:

$$I_1 = \frac{1}{2}k1 * (Vref - V_{DATA1})^2,$$

where, k1 is a constant determined by parameters of the eighth transistor M8.

Similarly, for the twelfth transistor M12, a voltage Vgs2 between the gate electrode and the source electrode of the twelfth transistor M12 equals to $V_{DATA2}$−Vref+Vth2 (that is, Vgs2=$V_{DATA2}$−Vref+Vth2), where $V_{DATA2}$ is a voltage value of the second data signal DATA2. Substituting Vgs2=$V_{DATA2}$−Vref+Vth2 into a saturation area current formula of the twelfth transistor M12, an expression of current $I_2$ flowing through the source electrode and the drain electrode of the twelfth transistor M12 can be obtained as follows:

$$I_2 = \frac{1}{2}k2 * (Vref - V_{DATA2})^2$$

At the end of the third stage S3, an internal compensation of pixel circuits in the $i^{th}$ row is completed. The internal compensation of the pixel circuits can prevent the effect of a threshold drift of a drive transistor on display uniformity.

In this embodiment, by the demultiplexing circuit, the first multiplexing signal line, and the second multiplexing signal line, the reset signal can be output to the first reset circuit via the first multiplexing signal line, and the reset signal can be output to the second reset circuit via the second multiplexing signal line; additionally, the first data signal can be output to the first data writing circuit via the first multiplexing signal line, and the second data signal can be output to the second data writing circuit via the second multiplexing signal line. In this way, for each pixel circuit, one signal line is reduced, so that a space can be saved, thereby optimizing pixel layout and increasing a display resolution or a pixel light-emitting area, while helping to reset a data signal line and increasing coherency of signal writing.

Figure 5:
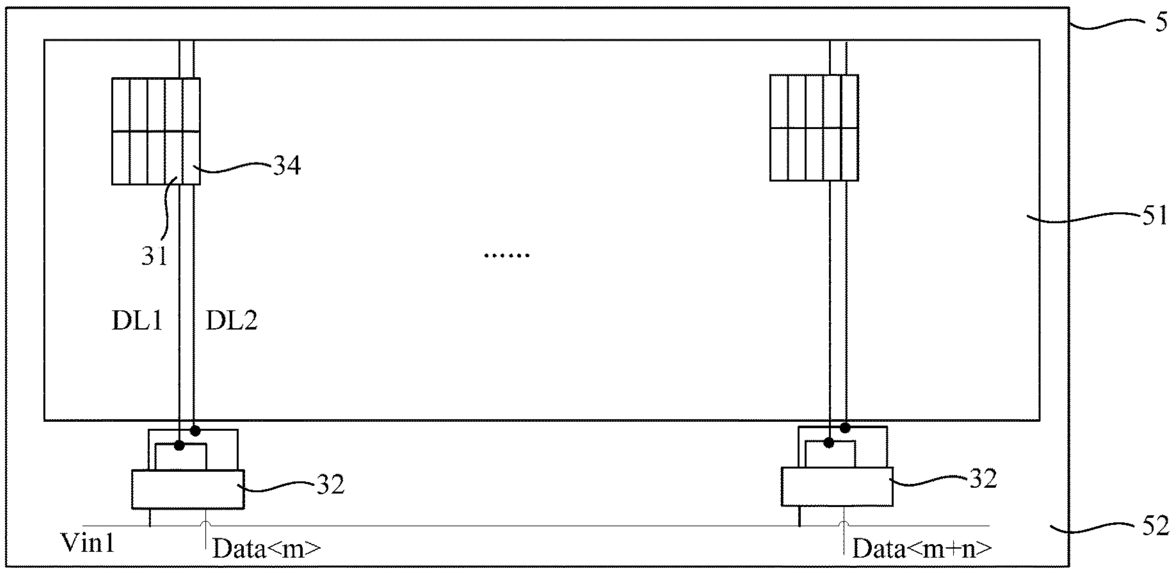
FIG. 5 is a schematic diagram illustrating a structure of another display panel according to an embodiment of the present application.

At least one embodiment of the present application further provides a display panel. As shown in FIG. 5, a display panel 5 includes a display region 51 and a peripheral region 52. The peripheral region 52 is adjacent to the display region 51, and the peripheral area 52 may surround the display region 51.

In this embodiment, the display region 51 can include a plurality of pixel circuits arranged in array. As shown in FIG. 5, the pixel circuits arranged in array can include a first pixel circuit 31 and a second pixel circuit 34. The first pixel circuit 31 can be located in an $i^{th}$ row and a $j^{th}$ column, and the second pixel circuit 34 can be located in the $i^{th}$ row and a $(j+1)^{th}$ column.

In this embodiment, the peripheral region 52 can include a plurality of demultiplexing circuits 32, one reset signal line Vin1, and a plurality of data signal lines Data. The demultiplexing circuits 32 each can be connected to the reset signal line Vin1, and each of the demultiplexing circuits 32 can be connected to only one of the data signal lines Data. For example, an $m^{th}$ demultiplexing circuit 32 can be connected to an $m^{th}$ data signal line Data<m>, and an $(m+n)^{th}$ demultiplexing circuit 32 can be connected to an $(m+n)^{th}$ data signal line Data<m+n>, where m and n are positive integers.

In this embodiment, each of the demultiplexing circuits 32 is connected to the first pixel circuit 31 via a first multiplexing signal line DL1, and to the second pixel circuit 34 via a second multiplexing signal line DL2. For example, for the $m^{th}$ demultiplexing circuit 32, the $m^{th}$ demultiplexing circuit 32 can be connected to the first pixel circuit 31 located in the $i^{th}$ row and the $j^{th}$ column via an $m^{th}$ first multiplexing signal line DL1, as well as to the second pixel circuit 34 located in the $i^{th}$ row and the $j+1^{th}$ column via an $m^{th}$ second multiplexing signal line DL2.

For a same demultiplexing circuit 32, during a reset time period, the demultiplexing circuit 32 receives a reset signal VIN1 provided via the reset signal line Vin1, and transmits the reset signal VIN1 to the first pixel circuit 31 via the first multiplexing signal line DL1, and to the second pixel circuit 34 via the second multiplexing signal line DL2. During a first data writing time period, the demultiplexing circuit 32 receives a first data signal DATA1 provided via a data signal line Data, and outputs the first data signal DATA1 to the first pixel circuit 31 via the first multiplexing signal line DL1. During a second data writing time period, the demultiplexing circuit 32 receives a second data signal DATA2 provided via a data signal line Data, and outputs the second data signal DATA2 to the second pixel circuit 34 via the second multiplexing signal line DL2.

For the first pixel circuit 31, the first multiplexing signal line DL1 is used for transmitting both the reset signal VIN1 and the first data signal DATA1, so that one signal line is saved. For the second pixel circuit 34, the second multiplexing signal line DL2 is used for transmitting both the reset signal VIN1 and the second data signal DATA2, so that one signal line is saved. Further, for each of the pixel circuits arranged in array, one signal line is reduced, so that a space can be saved, thereby optimizing pixel layout and increasing a display resolution or a pixel light-emitting area, while helping to reset a data signal line and increasing coherency of signal writing.

It should be noted that, in the embodiments of the present application, the first pixel circuit 31 being a 4T1C pixel circuit and the second pixel circuit 34 being a 4T1C pixel circuit are taken as an example for illustration. It will be understood that the first pixel circuit 31 and the second pixel circuit 34 can be other pixel circuits such as, but not limited to, 5T1C pixel circuits, 6T1C pixel circuits, or 7T1C pixel circuits.

At least one embodiment of the present application further provides a display device, including a display module, and a display panel according to any of the embodiments as described above.

In this embodiment, by a demultiplexing circuit and a first multiplexing signal line, a reset signal can be output to a first reset circuit via a first multiplexing signal line; additionally, a first data signal can be output to a first data writing circuit via the first multiplexing signal line. In this way, for a pixel circuit, one signal line is reduced, so that a space can be saved, thereby optimizing pixel layout and increasing a display resolution or a pixel light-emitting area, while helping to reset a data signal line and increasing coherency of signal writing.

Figure 6:
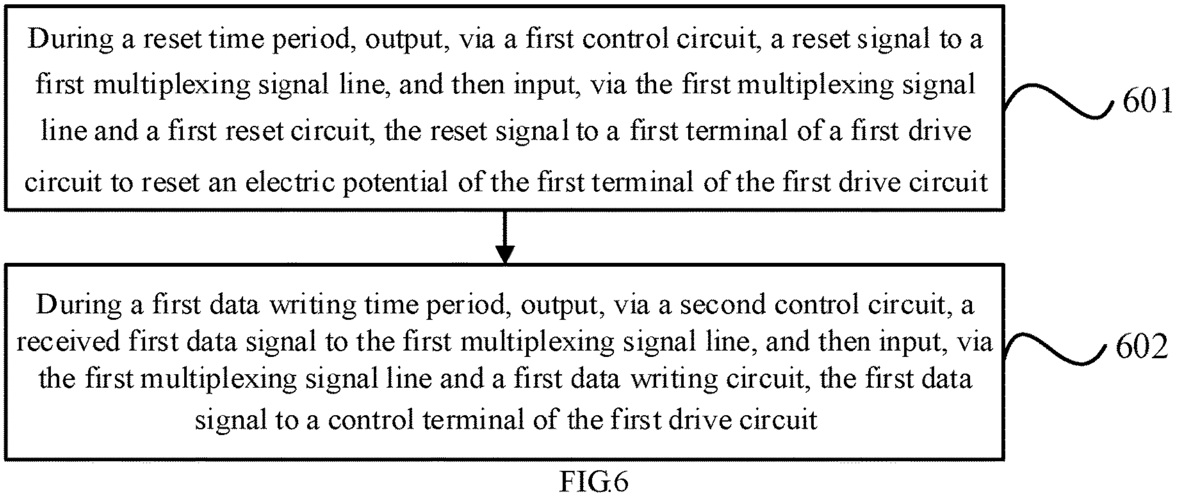
FIG. 6 is a flow chart illustrating a method of driving a display panel according to an embodiment of the present application.

At least one embodiment of the present application further provides a method of driving a display panel. The method of driving a display panel is applied to a display panel according to any of the embodiments as described above. As shown in FIG. 6, the method includes the following steps 601 to 602:

At step 601, during a reset time period, a reset signal is output via a first control circuit to a first multiplexing signal line, and then the reset signal is input to a first terminal of a first drive circuit via the first multiplexing signal line and a first reset circuit to reset an electric potential of the first terminal of the first drive circuit.

In an embodiment, the method further includes: during the reset time period, the reset signal is output via a third control circuit to a second multiplexing signal line, and then the reset signal is input to a first terminal of a second drive circuit via the second multiplexing signal line and a second reset circuit to reset an electric potential of the first terminal of the second drive circuit.

At step 602, during a first data writing time period, a received first data signal is output via a second control circuit to the first multiplexing signal line, and the first data signal is input to a control terminal of the first drive circuit via the first multiplexing signal line and a first data writing circuit.

In an embodiment, the method further includes: during a second data writing time period, a received second data signal is output via a fourth control circuit to the second multiplexing signal line, and the second data signal is input to a control terminal of the second drive circuit via the second multiplexing signal line and a second data writing circuit.

In this embodiment, via a demultiplexing circuit and the first multiplexing signal line, the reset signal can be output to the first reset circuit via the first multiplexing signal line; additionally, the first data signal can be output to the first data writing circuit via the first multiplexing signal line. In this way, for a pixel circuit, one signal line is reduced, so that a space can be saved, thereby optimizing pixel layout and increasing a display resolution or a pixel light-emitting area, while helping to reset a data signal line and increasing coherency of signal writing.

It should be noted that the display device in this embodiment can be any product or component having a display function, such as electronic paper, a mobile phone, a tablet computer, a television, a laptop, a digital photo frame or a navigator.

It should be pointed out that in the drawings, sizes of layers and areas may be exaggerated for clarity of illustration. It will also be understood that when an element or layer is referred to as being "on" another element or layer, the element or layer can be directly on the another element or layer, or an intermediate layer may be provided therebetween. In addition, it will be understood that when an element or layer is referred to as being "below" another element or layer, the element or layer can be directly below the another element, or one and more intermediate layers or elements may be provided therebetween. It will also be understood that when a layer or element is referred to as being "between" two layers or elements, it can be an only layer between the two layers or elements, or one or more intermediate layers or elements may be provided between the two layers or elements. Similar reference signs indicate similar elements throughout.

In the present invention, terms "first" and "second" are used only for descriptive purposes, and cannot be understood as indicating or implying relative importance. A term "plurality" refers to two or more, unless specifically defined otherwise.

Other embodiments of the present application will be readily apparent to those skilled in the art after considering the specification and practicing the contents disclosed herein. The present application is intended to cover any variations, usage, or adaptations of the present application, which follow the general principle of the present application and involve common knowledge or conventional technical means in the art that are not disclosed in the present application. The specification and embodiments are to be regarded as illustrative only. The true scope and spirit of the present application are pointed out by the following claims.

It is to be understood that the present application is not limited to the specific structures that have been described and shown in the drawings, and various modifications and changes can be made without departing from the scope thereof. The scope of the application is to be limited only by the appended claims.

The invention claimed is:

1. A display panel, comprising:

a first pixel circuit, a first multiplexing signal line, and a demultiplexing circuit, wherein the first pixel circuit comprises a first reset circuit, a first data writing circuit, a first storage circuit, and a first drive circuit, wherein a first terminal of the first reset circuit is connected to a first terminal of the first drive circuit, a second terminal of the first reset circuit is connected to the first multiplexing signal line, the first terminal of the first drive circuit is further connected to a first light-emitting element, a control terminal of the first drive circuit is connected to a first terminal of the first data writing circuit, a second terminal of the first data writing circuit is connected to the first multiplexing signal line, a first terminal of the first storage circuit is connected to the control terminal of the first drive circuit, and a second terminal of the first storage circuit is connected to the first terminal of the first drive circuit; and the demultiplexing circuit comprises a first control circuit and a second control circuit, wherein a first terminal of the first control circuit is connected to the first multiplexing signal line, a second terminal of the first control circuit is used for receiving a reset signal, a first terminal of the second control circuit is connected to the first multiplexing signal line, and a second terminal of the second control circuit is used for receiving a first data signal;

wherein the display panel further comprises a second pixel circuit and a second multiplexing signal line, wherein the second pixel circuit comprises a second reset circuit, a second data writing circuit, a second storage circuit and a second drive circuit, wherein a first terminal of the second reset circuit is connected to a first terminal of the second drive circuit, a second terminal of the second reset circuit is connected to the second multiplexing signal line, the first terminal of the second drive circuit is further connected to a second light-emitting element, a control terminal of the second drive circuit is connected to a first terminal of the second data writing circuit, a second terminal of the second data writing circuit is connected to the second multiplexing signal line, a first terminal of the second storage circuit is connected to the control terminal of the second drive circuit, and a second terminal of the second storage circuit is connected to the first terminal of the second drive circuit; and the demultiplexing circuit further comprises a third control circuit and a fourth control circuit, wherein a first terminal of the third control circuit is connected to the second multiplexing signal line, a second terminal of the third control circuit is used for receiving the reset signal, a first terminal of the fourth control circuit is connected to the second multiplexing signal line, and a second terminal of the fourth control circuit is used for receiving a second data signal;

wherein the display panel further comprises a first control signal line, a second control signal line, and a third control signal line, wherein a control terminal of the first control circuit and a control terminal of the third control circuit are respectively connected to the first control signal line, a control terminal of the second control circuit is connected to the second control signal line, and a control terminal of the fourth control circuit is connected to the third control signal line.

2. The display panel according to claim 1, further comprising: a reset signal line and a data signal line, wherein the second terminal of the first control circuit and the second terminal of the third control circuit are connected in parallel, and further connected to the reset signal line; and the second terminal of the second control circuit and the second terminal of the fourth control circuit are connected in parallel, and further connected to the data signal line.

3. The display panel according to claim 1, wherein the first control circuit comprises a first transistor, wherein a first terminal of the first transistor is the first terminal of the first control circuit, a second terminal of the first transistor is the second terminal of the first control circuit, and a control terminal of the first transistor is the control terminal of the first control circuit;

the second control circuit comprises a second transistor, wherein a first terminal of the second transistor is the first terminal of the second control circuit, and a second terminal of the second transistor is the second terminal of the second control circuit, and a control terminal of the second transistor is the control terminal of the second control circuit;

the third control circuit comprises a third transistor, wherein a first terminal of the third transistor is the first terminal of the third control circuit, a second terminal of the third transistor is the second terminal of the third control circuit, and a control terminal of the third transistor is the control terminal of the third control circuit; and the fourth control circuit comprises a fourth transistor, wherein a first terminal of the fourth transistor is the first terminal of the fourth control circuit, a second terminal of the fourth transistor is the second terminal of the fourth control circuit, and a control terminal of the fourth transistor is the control terminal of the fourth control circuit.

4. The display panel according to claim 3, wherein the first transistor is an N-type transistor, wherein the first terminal of the first transistor is a source electrode, the second terminal of the first transistor is a drain electrode, and the control terminal of the first transistor is a gate electrode;

the second transistor is an N-type transistor, wherein the first terminal of the second transistor is a source electrode, the second terminal of the second transistor is a drain electrode, and the control terminal of the second transistor is a gate electrode;

the third transistor is an N-type transistor, wherein the first terminal of the third transistor is a source electrode, the second terminal of the third transistor is a drain electrode, and the control terminal of the third transistor is a gate electrode;

the fourth transistor is an N-type transistor, wherein the first terminal of the fourth transistor is a source electrode, the second terminal of the fourth transistor is a drain electrode, and the control terminal of the fourth transistor is a gate electrode.

5. The display panel according to claim 1, further comprising: a first gate line and a second gate line, wherein a control terminal of the first reset circuit and a control terminal of the second reset circuit are respectively connected to the first gate line; and a control terminal of the first data writing circuit and a control terminal of the second data writing circuit are respectively connected to the second gate line.

6. The display panel according to claim 1, wherein the first pixel circuit further comprises a first compensation circuit, wherein a first terminal of the first compensation circuit is connected to the control terminal of the first drive circuit, a second terminal of the first compensation circuit is connected to a power signal line, and the power signal line is used for providing a reference voltage signal; and the second pixel circuit further comprises a second compensation circuit, wherein a first terminal of the second compensation circuit is connected to the control terminal of the second drive circuit, and a second terminal of the second compensation circuit is connected to the power signal line.

7. The display panel according to claim 6, further comprising a third gate line, wherein a control terminal of the first compensation circuit and a control terminal of the second compensation circuit are respectively connected to the third gate line.

8. The display panel according to claim 6, wherein the first reset circuit comprises a fifth transistor, wherein a first terminal of the fifth transistor is the first terminal of the first reset circuit, a second terminal of the fifth transistor is the second terminal of the first reset circuit, and a control terminal of the fifth transistor is a control terminal of the first reset circuit;

the first compensation circuit comprises a sixth transistor, wherein a first terminal of the sixth transistor is the first terminal of the first compensation circuit, a second terminal of the sixth transistor is the second terminal of the first compensation circuit, and a control terminal of the sixth transistor is a control terminal of the first compensation circuit;

the first data writing circuit comprises a seventh transistor, wherein a first terminal of the seventh transistor is the first terminal of the first data writing circuit, a second terminal of the seventh transistor is the second terminal of the first data writing circuit, and a control terminal of the seventh transistor is a control terminal of the first data writing circuit;

the first drive circuit comprises an eighth transistor, wherein a first terminal of the eighth transistor is the first terminal of the first drive circuit, a second terminal of the eighth transistor is a second terminal of the first drive circuit, and a control terminal of the eighth transistor is the control terminal of the first drive circuit;

the first storage circuit comprises a first capacitor, wherein a first terminal of the first capacitor is the first terminal of the first storage circuit, and a second terminal of the first capacitor is the second terminal of the first storage circuit;

the second reset circuit comprises a ninth transistor, wherein a first terminal of the ninth transistor is the first terminal of the second reset circuit, a second terminal of the ninth transistor is the second terminal of the second reset circuit, and a control terminal of the ninth transistor is a control terminal of the second reset circuit;

the second compensation circuit comprises a tenth transistor, wherein a first terminal of the tenth transistor is the first terminal of the second compensation circuit, a second terminal of the tenth transistor is the second terminal of the second compensation circuit, and a control terminal of the tenth transistor is a control terminal of the second compensation circuit;

the second data writing circuit comprises an eleventh transistor, wherein a first terminal of the eleventh transistor is the first terminal of the second data writing circuit, a second terminal of the eleventh transistor is the second terminal of the second data writing circuit, and a control terminal of the eleventh transistor is a control terminal of the second data writing circuit;

the second drive circuit comprises a twelfth transistor, wherein a first terminal of the twelfth transistor is the first terminal of the second drive circuit, a second terminal of the twelfth transistor is a second terminal of the second drive circuit, and a control terminal of the twelfth transistor is the control terminal of the second drive circuit; and the second storage circuit comprises a second capacitor, wherein a first terminal of the second capacitor is the first terminal of the second storage circuit, and a second terminal of the second capacitor is the second terminal of the second storage circuit.

9. The display panel according to claim 8, wherein the fifth transistor is an N-type transistor, wherein the first terminal of the fifth transistor is a source electrode, the second terminal of the fifth transistor is a drain electrode, and the control terminal of the fifth transistor is a gate electrode;

the sixth transistor is an N-type transistor, wherein the first terminal of the sixth transistor is a source electrode, the second terminal of the sixth transistor is a drain electrode, and the control terminal of the sixth transistor is a gate electrode;

the seventh transistor is an N-type transistor, wherein the first terminal of the seventh transistor is a source electrode, the second terminal of the seventh transistor is a drain electrode, and the control terminal of the seventh transistor is a gate electrode;

the eighth transistor is an N-type transistor, wherein the first terminal of the eighth transistor is a source electrode, the second terminal of the eighth transistor is a drain electrode, and the control terminal of the eighth transistor is a gate electrode;

the ninth transistor is an N-type transistor, wherein the first terminal of the ninth transistor is a source electrode, the second terminal of the ninth transistor is a drain electrode, and the control terminal of the ninth transistor is a gate electrode;

the tenth transistor is an N-type transistor, wherein the first terminal of the tenth transistor is a source electrode, the second terminal of the tenth transistor is a drain electrode, and the control terminal of the tenth transistor is a gate electrode;

the eleventh transistor is an N-type transistor, wherein the first terminal of the eleventh transistor is a source electrode, the second terminal of the eleventh transistor is a drain electrode, and the control terminal of the eleventh transistor is a gate electrode; and the twelfth transistor is an N-type transistor, wherein the first terminal of the twelfth transistor is a source electrode, the second terminal of the twelfth transistor is a drain electrode, and the control terminal of the twelfth transistor is a gate electrode.

10. The display panel according to claim 1, comprising a display region and a peripheral region, wherein the peripheral region is adjacent to the display region, the first pixel circuit is located in the display region, and the demultiplexing circuit is located in the peripheral region.

11. A method of driving a display panel, applied to a display panel according to claim 1, comprising:

during a reset time period, outputting, via the first control circuit, the reset signal to the first multiplexing signal line, and inputting, via the first multiplexing signal line and the first reset circuit, the reset signal to the first terminal of the first drive circuit to reset an electric potential of the first terminal of the first drive circuit; and during a first data writing time period, outputting, via the second control circuit, the received first data signal to the first multiplexing signal line, and inputting, via the first multiplexing signal line and the first data writing circuit, the first data signal to the control terminal of the first drive circuit.

12. The method according to claim 11, further comprising:

during the reset time period, outputting, via the third control circuit, the reset signal to the second multiplexing signal line, and inputting, via the second multiplexing signal line and the second reset circuit, the reset signal to the first terminal of the second drive circuit to reset an electric potential of the first terminal of the second drive circuit; and during a second data writing time period, outputting, via the fourth control circuit, the received second data signal to the second multiplexing signal line, and inputting, via the second multiplexing signal line and the second data writing circuit, the second data signal to the control terminal of the second drive circuit.

13. A display device, comprising a display panel, and the display panel comprises a first pixel circuit, a first multiplexing signal line, and a demultiplexing circuit, wherein the first pixel circuit comprises a first reset circuit, a first data writing circuit, a first storage circuit, and a first drive circuit, wherein a first terminal of the first reset circuit is connected to a first terminal of the first drive circuit, a second terminal of the first reset circuit is connected to the first multiplexing signal line, the first terminal of the first drive circuit is further connected to a first light-emitting element, a control terminal of the first drive circuit is connected to a first terminal of the first data writing circuit, a second terminal of the first data writing circuit is connected to the first multiplexing signal line, a first terminal of the first storage circuit is connected to the control terminal of the first drive circuit, and a second terminal of the first storage circuit is connected to the first terminal of the first drive circuit; and the demultiplexing circuit comprises a first control circuit and a second control circuit, wherein a first terminal of the first control circuit is connected to the first multiplexing signal line, a second terminal of the first control circuit is used for receiving a reset signal, a first terminal of the second control circuit is connected to the first multiplexing signal line, and a second terminal of the second control circuit is used for receiving a first data signal;

wherein the display panel further comprises a second pixel circuit and a second multiplexing signal line, wherein the second pixel circuit comprises a second reset circuit, a second data writing circuit, a second storage circuit and a second drive circuit, wherein a first terminal of the second reset circuit is connected to a first terminal of the second drive circuit, a second terminal of the second reset circuit is connected to the second multiplexing signal line, the first terminal of the second drive circuit is further connected to a second light-emitting element, a control terminal of the second drive circuit is connected to a first terminal of the second data writing circuit, a second terminal of the second data writing circuit is connected to the second multiplexing signal line, a first terminal of the second storage circuit is connected to the control terminal of the second drive circuit, and a second terminal of the second storage circuit is connected to the first terminal of the second drive circuit; and the demultiplexing circuit further comprises a third control circuit and a fourth control circuit, wherein a first terminal of the third control circuit is connected to the second multiplexing signal line, a second terminal of the third control circuit is used for receiving the reset signal, a first terminal of the fourth control circuit is connected to the second multiplexing signal line, and a second terminal of the fourth control circuit is used for receiving a second data signal;

wherein the display panel further comprises a first control signal line, a second control signal line, and a third control signal line, wherein a control terminal of the first control circuit and a control terminal of the third control circuit are respectively connected to the first control signal line, a control terminal of the second control circuit is connected to the second control signal line, and a control terminal of the fourth control circuit is connected to the third control signal line.

14. The display device according to claim 13, wherein the display panel further comprises a reset signal line and a data signal line, wherein the second terminal of the first control circuit and the second terminal of the third control circuit are connected in parallel, and further connected to the reset signal line; and the second terminal of the second control circuit and the second terminal of the fourth control circuit are connected in parallel, and further connected to the data signal line.

15. The display device according to claim 13, wherein the first control circuit comprises a first transistor, wherein a first terminal of the first transistor is the first terminal of the first control circuit, a second terminal of the first transistor is the second terminal of the first control circuit, and a control terminal of the first transistor is the control terminal of the first control circuit;

the second control circuit comprises a second transistor, wherein a first terminal of the second transistor is the first terminal of the second control circuit, and a second terminal of the second transistor is the second terminal of the second control circuit, and a control terminal of the second transistor is the control terminal of the second control circuit;

the third control circuit comprises a third transistor, wherein a first terminal of the third transistor is the first terminal of the third control circuit, a second terminal of the third transistor is the second terminal of the third control circuit, and a control terminal of the third transistor is the control terminal of the third control circuit; and the fourth control circuit comprises a fourth transistor, wherein a first terminal of the fourth transistor is the first terminal of the fourth control circuit, a second terminal of the fourth transistor is the second terminal of the fourth control circuit, and a control terminal of the fourth transistor is the control terminal of the fourth control circuit.

16. The display device according to claim 15, wherein the first transistor is an N-type transistor, wherein the first terminal of the first transistor is a source electrode, the second terminal of the first transistor is a drain electrode, and the control terminal of the first transistor is a gate electrode;

the second transistor is an N-type transistor, wherein the first terminal of the second transistor is a source electrode, the second terminal of the second transistor is a drain electrode, and the control terminal of the second transistor is a gate electrode;

the third transistor is an N-type transistor, wherein the first terminal of the third transistor is a source electrode, the second terminal of the third transistor is a drain electrode, and the control terminal of the third transistor is a gate electrode;

the fourth transistor is an N-type transistor, wherein the first terminal of the fourth transistor is a source electrode, the second terminal of the fourth transistor is a drain electrode, and the control terminal of the fourth transistor is a gate electrode.

17. The display device according to claim 13, wherein the display panel further comprises a first gate line and a second gate line, wherein a control terminal of the first reset circuit and a control terminal of the second reset circuit are respectively connected to the first gate line; and a control terminal of the first data writing circuit and a control terminal of the second data writing circuit are respectively connected to the second gate line.

18. The display device according to claim 13, wherein the first pixel circuit further comprises a first compensation circuit, wherein a first terminal of the first compensation circuit is connected to the control terminal of the first drive circuit, a second terminal of the first compensation circuit is connected to a power signal line, and the power signal line is used for providing a reference voltage signal; and the second pixel circuit further comprises a second compensation circuit, wherein a first terminal of the second compensation circuit is connected to the control terminal of the second drive circuit, and a second terminal of the second compensation circuit is connected to the power signal line.

19. The display device according to claim 18, wherein the display panel further comprises a third gate line, wherein a control terminal of the first compensation circuit and a control terminal of the second compensation circuit are respectively connected to the third gate line.

20. The display device according to claim 18, wherein the first reset circuit comprises a fifth transistor, wherein a first terminal of the fifth transistor is the first terminal of the first reset circuit, a second terminal of the fifth transistor is the second terminal of the first reset circuit, and a control terminal of the fifth transistor is a control terminal of the first reset circuit;

the first compensation circuit comprises a sixth transistor, wherein a first terminal of the sixth transistor is the first terminal of the first compensation circuit, a second terminal of the sixth transistor is the second terminal of the first compensation circuit, and a control terminal of the sixth transistor is a control terminal of the first compensation circuit;

the first data writing circuit comprises a seventh transistor, wherein a first terminal of the seventh transistor is the first terminal of the first data writing circuit, a second terminal of the seventh transistor is the second terminal of the first data writing circuit, and a control terminal of the seventh transistor is a control terminal of the first data writing circuit;

the first drive circuit comprises an eighth transistor, wherein a first terminal of the eighth transistor is the first terminal of the first drive circuit, a second terminal of the eighth transistor is a second terminal of the first drive circuit, and a control terminal of the eighth transistor is the control terminal of the first drive circuit;

the first storage circuit comprises a first capacitor, wherein a first terminal of the first capacitor is the first terminal of the first storage circuit, and a second terminal of the first capacitor is the second terminal of the first storage circuit;

the second reset circuit comprises a ninth transistor, wherein a first terminal of the ninth transistor is the first terminal of the second reset circuit, a second terminal of the ninth transistor is the second terminal of the second reset circuit, and a control terminal of the ninth transistor is a control terminal of the second reset circuit;

the second compensation circuit comprises a tenth transistor, wherein a first terminal of the tenth transistor is the first terminal of the second compensation circuit, a second terminal of the tenth transistor is the second terminal of the second compensation circuit, and a control terminal of the tenth transistor is a control terminal of the second compensation circuit;

the second data writing circuit comprises an eleventh transistor, wherein a first terminal of the eleventh transistor is the first terminal of the second data writing circuit, a second terminal of the eleventh transistor is the second terminal of the second data writing circuit, and a control terminal of the eleventh transistor is a control terminal of the second data writing circuit;

the second drive circuit comprises a twelfth transistor, wherein a first terminal of the twelfth transistor is the first terminal of the second drive circuit, a second terminal of the twelfth transistor is a second terminal of the second drive circuit, and a control terminal of the twelfth transistor is the control terminal of the second drive circuit; and the second storage circuit comprises a second capacitor, wherein a first terminal of the second capacitor is the first terminal of the second storage circuit, and a second terminal of the second capacitor is the second terminal of the second storage circuit.

* * * * *